United States Patent
Fitzgibbon

(10) Patent No.: US 6,597,138 B2
(45) Date of Patent: Jul. 22, 2003

(54) METHOD AND APPARATUS FOR CONTROLLING POWER SUPPLIED TO A MOTOR

(75) Inventor: James J. Fitzgibbon, Batavia, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 0 days.

(21) Appl. No.: 09/920,150

(22) Filed: Aug. 1, 2001

(65) Prior Publication Data

US 2003/0026599 A1 Feb. 6, 2003

(51) Int. Cl.$^7$ .................................................. H02P 7/00
(52) U.S. Cl. ....................... 318/434; 318/808; 318/778; 323/289; 363/123; 363/124
(58) Field of Search ................................. 318/778, 808, 318/434; 388/800; 323/289; 363/123, 124

(56) References Cited

U.S. PATENT DOCUMENTS

| | | | |
|---|---|---|---|
| 3,262,037 A | 7/1966 | McCabe et al. | 318/231 |
| 3,434,034 A | 3/1969 | Garber et al. | 321/43 |
| 3,940,680 A | 2/1976 | Tadokoro et al. | 321/27 |
| 3,942,085 A | 3/1976 | Tadakuma et al. | 318/341 |
| 4,088,937 A | 5/1978 | Uchida et al. | 318/441 |
| 4,401,933 A * | 8/1983 | Davy et al. | 318/778 |
| 4,444,285 A * | 4/1984 | Stewart et al. | 180/65.4 |
| 4,641,234 A | 2/1987 | Bonal | 363/124 |
| 4,748,532 A * | 5/1988 | Commander et al. | 323/289 |
| 4,763,061 A * | 8/1988 | Schwarz | 320/140 |
| 4,768,142 A | 8/1988 | Pasma | 363/89 |
| 4,776,433 A * | 10/1988 | Lagree et al. | 187/316 |
| 4,855,653 A | 8/1989 | Lemirande | 318/282 |
| 4,941,076 A * | 7/1990 | Diaz | 363/49 |
| 5,003,455 A | 3/1991 | Miller | 363/87 |
| 5,045,989 A | 9/1991 | Higaki et al. | 363/37 |
| 5,072,355 A | 12/1991 | Huillet | 363/89 |
| 5,151,638 A | 9/1992 | Beckerman | 318/434 |
| 5,262,932 A * | 11/1993 | Stanley et al. | 323/272 |
| 5,563,781 A | 10/1996 | Clauter et al. | 363/124 |

* cited by examiner

Primary Examiner—Rita Leykin
(74) Attorney, Agent, or Firm—Fitch, Evan, Tabin & Flannery

(57) ABSTRACT

A method and apparatus for controlling power supplied to a motor comprising a power controller having a source of electrical power for providing the necessary power to operate the apparatus, an oscillator for generating gating signals at a relatively higher frequency than the electrical power supplied, circuitry responsive to the gating signals for gating the low frequency electrical power to generate a DC voltage, and an inhibitor for inhibiting the generating of gating signals by the oscillator to regulate the DC voltage generated so as to control the speed of any motor connected to the apparatus. The apparatus may be setup to inhibit the oscillator when certain circuit conditions such as an over current condition is detected. The apparatus may also be setup to keep the oscillator in an OFF state once inhibited until a specified amplitude or period of the input signal has been reached.

14 Claims, 8 Drawing Sheets

| Fig. 4a | Fig. 4b |

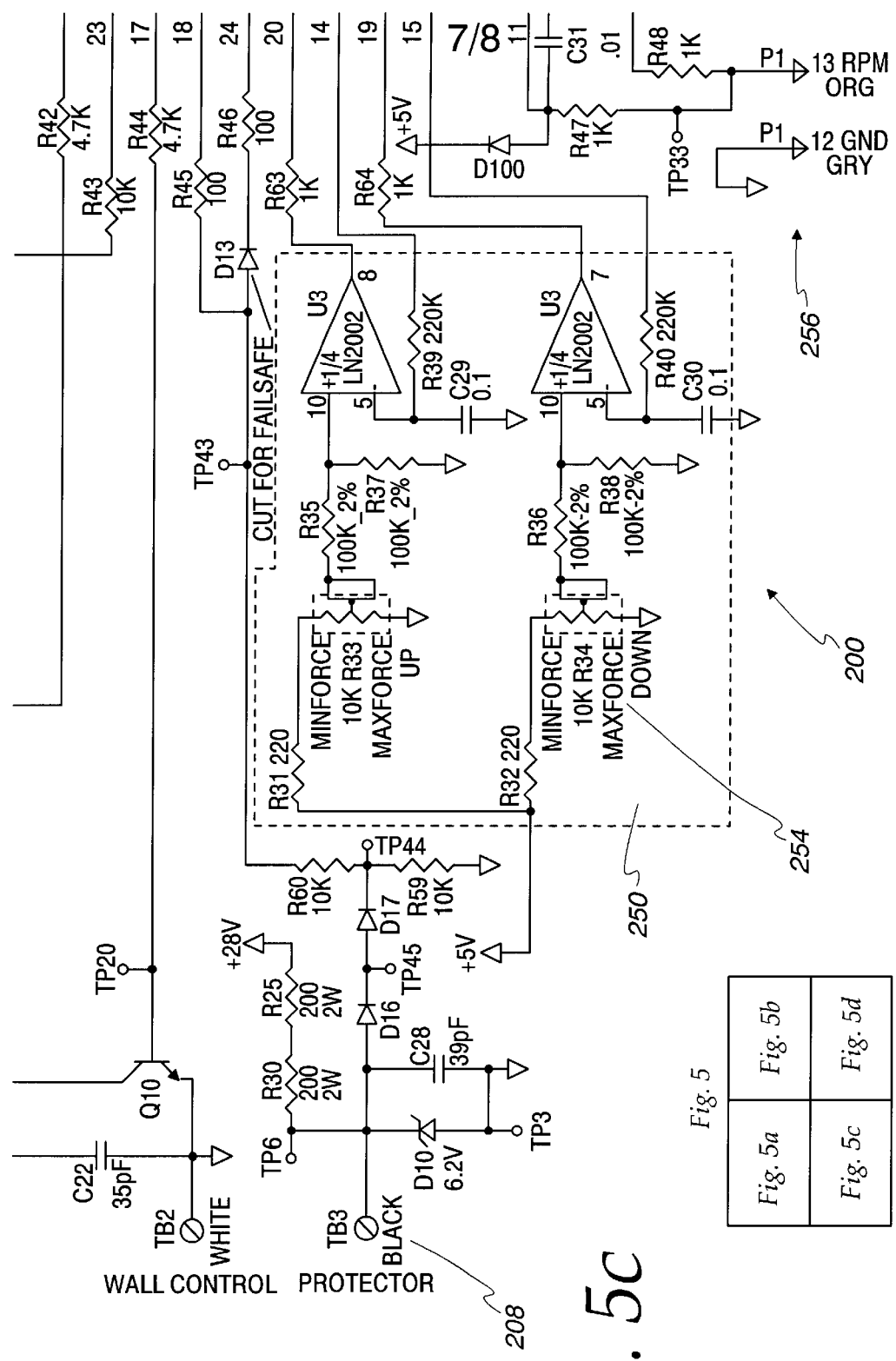

METHOD AND APPARATUS FOR CONTROLLING POWER SUPPLIED TO A MOTOR

REFERENCE TO A COMPUTER PROGRAM LISTING APPENDIX SUBMITTED ON A COMPACT DISC

The computer program listing appendix contained within file "CodeListing.txt" on compact disc "1 of 1", which has been filed with the United States Patent and Trademark Office in duplicate, is hereby incorporated herein by reference. This file was created on May 10, 2001, and is 287 kB in size.

BACKGROUND OF THE INVENTION

This invention relates generally to power controls and more particularly concerns a switched-mode power supply for powering a DC motor.

Most generally available electrical power in the world is delivered as fifty or sixty Hertz (50–60 Hz) alternating current (AC) in the range of one hundred to three hundred volts (100–300V). Such power can be used directly by equipment such as AC motors to cause the motor's output shaft to rotate. The control of light and relatively inexpensive AC motors is however limited when compared to the possible control of direct current (DC) motors. DC motors exhibit better control at low revolutions-per-minute (rpm), better torque control, and their rotation speeds can more accurately be controlled by regulating the voltage applied to the motor input terminals. The direction of rotation of the DC motor is generally controlled by controlling the polarity of DC voltage applied to the input terminals of the device.

Common DC control arrangements consist of a relay or other switching apparatus to control the applied DC potential, and some form of power regulator to connect portions of the power from a DC supply to the motor. The variable power connection may consist of something as simple as a rheostat or something more complex such as a semiconductor switching arrangement. Although the power couplers may vary in sophistication, the system is basically a source of DC power coupled by a regulator to the motor or other power using device.

DC power is generally used at low voltages and high currents to best perform its allotted tasks. For example, a twenty four Volt (24V) DC motor is easy to control and provides sufficient power for applications such as moving barriers (e.g., garage doors, gates and shutters). Creating such DC voltage from main AC power supplies creates certain difficulties. First, a transformer is needed which is large, heavy and expensive due to its operation at low frequencies. It has been found, however, that large and expensive transformers can be avoided by the use of DC chopper circuits which operate at frequencies above the normal audio frequency range, e.g., forty kilo-Hertz (40 kHz). In such circuits, the AC supplied from main power supplies is first rectified into DC (perhaps with ripple) and then the DC is gated at a high frequency through a relatively small transformer to produce the desired DC power level at the desired voltage range.

Such switched-mode DC power supplies are in use today. They are used, however, in the old manner as a part of the DC supply which is connected to the load (e.g., motor), via a regulating device. The regulation of DC power at the maximum power level creates power and must be done using expensive switching apparatus capable of dissipating considerable power (e.g., switches that are capable of converting excessive power into heat). What is needed in the art, therefore, is a lighter and less expensive method and arrangement for creating DC power and regulating the application of this power to a load.

SUMMARY OF THE INVENTION

A method and apparatus for controlling power supplied to a motor is described herein and provides a power controller that is capable of using a smaller, lighter and less expensive transformer and can control motor speed in a more efficient manner by utilizing a minimal amount of components and taking advantage of existing circuit structure. In one form, the apparatus includes a source of electrical power for providing the necessary power to operate the apparatus, a converter for supplying power to a DC motor, an oscillator operating at a relatively higher frequency than the frequency of the electrical power supplied and capable of generating gating signals to the converter, and an inhibitor for inhibiting the generating of gating signals by the oscillator to regulate the power supplied to the motor.

According to a preferred embodiment, an AC input signal is full wave rectified and supplied to gating circuitry coupled to the converter. The rectified signal is also used to provide power to an oscillator which generates gating signals that drive the gating circuitry coupled to a converter on and off. A switching mechanism is coupled to the oscillator and is utilized to inhibit the oscillator from generating gating signals which in turn prevents the converter from supplying power to a load. In the preferred embodiment, the switching mechanism is a circuit that is capable of inhibiting the oscillator when over current conditions are detected or when a controller detects circuit conditions in which it is desired to regulate the power supplied to the load. Examples of some circuit conditions that may be used to trigger the inhibitor when the load is a DC motor include detected motor speed, movable barrier speed, RPM, movable barrier position, force and limit readings, barrier obstruction readings, and the like.

According to the preferred embodiment the apparatus is setup to keep the oscillator in an OFF state once it has been inhibited, until a desired amplitude of the main AC input signal frequency (or mains frequency) has been reached. Once the desired amplitude has been reached the oscillator is restarted and will remain on until the moveable barrier operator has completed its travel or until another condition for inhibiting the oscillator has been detected. In a particular setting, the oscillator will remain off once inhibited until the input signal's amplitude reaches zero. Once the amplitude reaches zero, the oscillator is restarted and resumes sending gating signals to the gating circuitry coupled to the converter. This configuration allows for a lighter and less expensive method and arrangement for creating DC power and regulating the application of this power to a load.

BRIEF DESCRIPTION OF THE DRAWINGS

Other objects and advantages of the invention will become apparent upon reading the following detailed description and upon reference to the drawings, in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE PREFERRED EMBODIMENT

Figure 1:
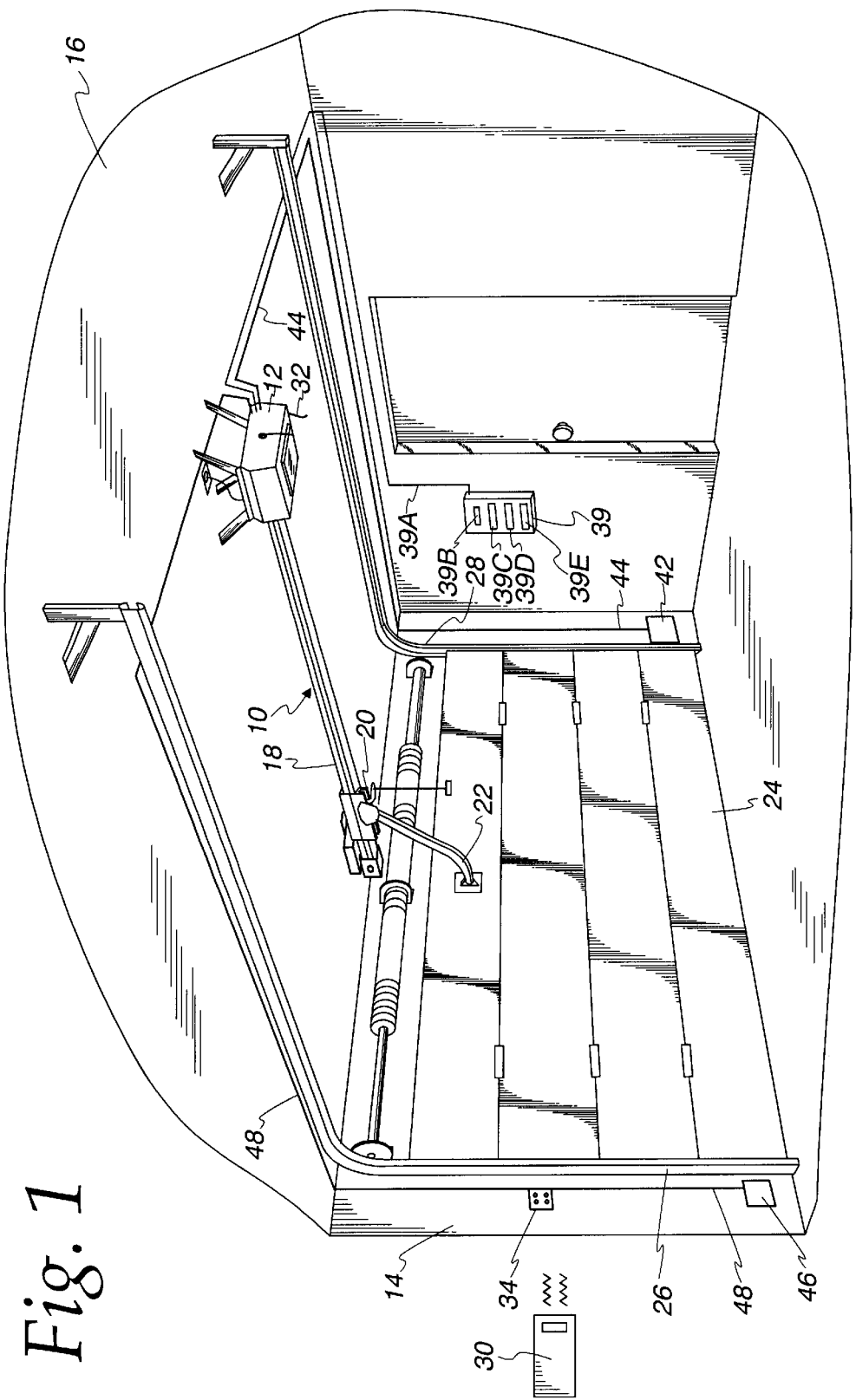
FIG. 1 is a perspective view of a movable barrier operator using the power controller described herein.

Referring now to the drawings and especially to FIG. 1, a movable barrier operator embodying the present invention is generally shown therein and identified by reference numeral 10. The movable barrier operator 10 includes a head unit 12 mounted within a garage 14 and is employed for controlling the opening and closing of garage 14. More specifically, the head unit 12 is mounted to the ceiling 16 of the garage 14 and includes a motor 60 (FIG. 2) and an apparatus 50 (FIG. 2) for controlling power supplied to the motor 60. Extending from the head unit 12 is a rail 18 having a releasable trolley 20 attached thereto and an arm 22 extending from the trolley 20 to a multiple paneled garage door 24 positioned for movement along a pair of door rails 26 and 28. The movable barrier operator 10 transfers the garage door 24 between the closed position illustrated in FIG. 1 and an open or raised position, allowing access to and from the garage 14. The moveable barrier operator 10 may be a garage door operator as shown in FIG. 1, a gate operator, a tubular motor operator, etc.

The system of FIG. 1 includes a hand-held transmitter unit 30 adapted to send signals to an antenna 32 positioned on or extending from the head unit 12 and coupled to a receiver located within the head unit 12. The receiver is connected to controller 58 (FIG. 2) and serves to deliver received commands to the controller 58 of the barrier operator. An external control pad 34 is positioned on the outside of the garage 14 having a plurality of buttons 35 thereon and communicates via radio frequency transmission with the antenna 32 and receiver of the head unit 12. A switch module 39 is mounted on a wall of the garage 14. The switch module 39 is connected to the head unit 12 by a pair of wires 39a. The switch module 39 includes a learn switch 39b, a light switch 39c, a lock switch 39d and a command switch 39e. Alternatively, the switch wired to the head unit 12 could be a simple on/off switch used to activate or stop the operation of the movable barrier.

An optical emitter 42 and an optical detector 46 are coupled to the head unit 12 by a pair of wires 44 and 48, respectively. The emitter 42 and detector 46 are used to satisfy the requirements of Underwriter's Laboratories, the Consumer Product Safety Commission and the like which require that garage door operators sold in the United States must, when in a closing mode and contacting an obstruction having a height of more than one inch, reverse and open the door in order to prevent damage to property and injury to persons. A controller of the garage door opening system 10 responds to the various input by starting and stopping a motor which provides the power needed to move the door to desired positions.

In the present embodiment the load is a 24V DC motor 60 for which it is desirable to vary the applied power to, for example, start and stop motion slowly and to maintain near constant speed of the motor when faced with non-constant mechanical loads. As will be discussed further below, the apparatus 50 regulates the amount of power supplied to the motor 60 by starting and stopping a DC chopper circuit. When the head unit 12 receives a signal to open/close the garage door 24, power is supplied to the motor 60 and the door 24 is then opened/closed. The apparatus 50 then regulates the power supplied to the motor 60 causing the motor to perform in a desired manner, (e.g., increases power supplied to motor 60 in order to increase the speed of door 24).

Figure 2:
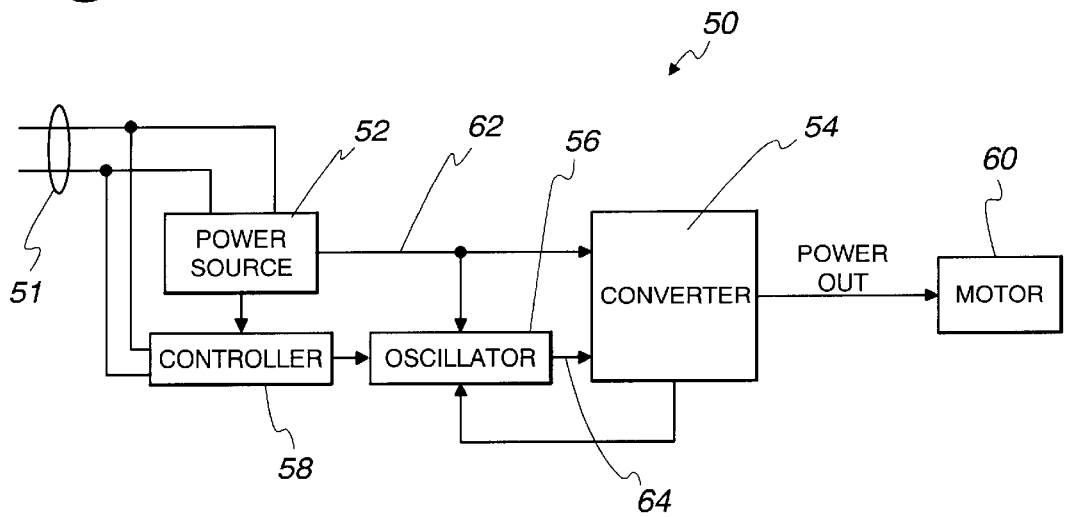
FIG. 2 is a block diagram of a power controller according to the invention for controlling power to a motor.

Referring now to FIG. 2, in which a block diagram of an apparatus 50 for controlling power to the motor 60 is shown. The apparatus 50 includes a power source 52 coupled to a converter 54 and an oscillator 56. The power source 52 receives an AC voltage on conductors 51 and provides a full wave rectified signal to converter 54 and power to oscillator 56 from its AC power supply. The signal supplied to converter 54 is used to generate DC voltage to motor 60. A graphical representation of the full wave rectified signal waveform is shown generally at reference numeral 62 in FIG. 3.

The oscillator 56 operates at a frequency higher than the mains frequency and drives the gating circuitry (or DC chopper) to output DC voltage from converter 54 to motor 60. More particularly, the oscillator 56 generates gating signals that are received by circuitry coupled to the converter 54 which is responsive to the gating signals and which will cause the desired power output from the converter 54 to be provided to the load. In a preferred embodiment, the oscillator is a self-oscillating half-bridge driver such as IR2155 manufactured by International Rectifier of El Segundo, Calif. (shown in FIG. 4).

The apparatus 50 further includes an inhibitor which is used to switch the oscillator 56 on and off thereby controlling the gating signals generated by the oscillator 56 and effectively regulating the amount of power supplied from the converter 54 to the motor 60. In a preferred embodiment, the inhibitor consists of circuitry which can detect various circuit conditions and inhibit the oscillator 56 in response thereto. For example, the inhibitor may be capable of detecting conditions in which excessive voltages or currents are being applied to the DC chopper and may be capable of responding to such conditions by shutting off the oscillator 56 until such conditions are corrected or until a predetermined event occurs. Further, the inhibitor may include a controller 58, such as the controller shown in FIG. 4, which is coupled to the oscillator 56 and is capable of inhibiting the oscillator 56 in response to detected circuit conditions such as motor speed, barrier speed, barrier position, RPM, limit values, force values, and the like. Once a condition requiring oscillator 56 shut down has been detected, the controller 58 may generate an inhibit signal causing the oscillator 56 to shut down. The controller 58 may be a microcontroller or other processor such as a microprocessor, gate array or the like.

Once the oscillator 56 has been inhibited, the apparatus 50 may be setup to automatically restart the oscillator 56 once the mains frequency has reached specific phase angles or amplitudes. In the present embodiment, the oscillator 56 is restarted (after being inhibited) every time the mains frequency reaches a phase angle or amplitude of zero (or zero crossing). When the oscillator 56 is restarted, it will begin generating gating signals to the gating circuitry of converter 56, which in turn drives converter 54 to supply DC voltage to motor 60.

Figure 3:
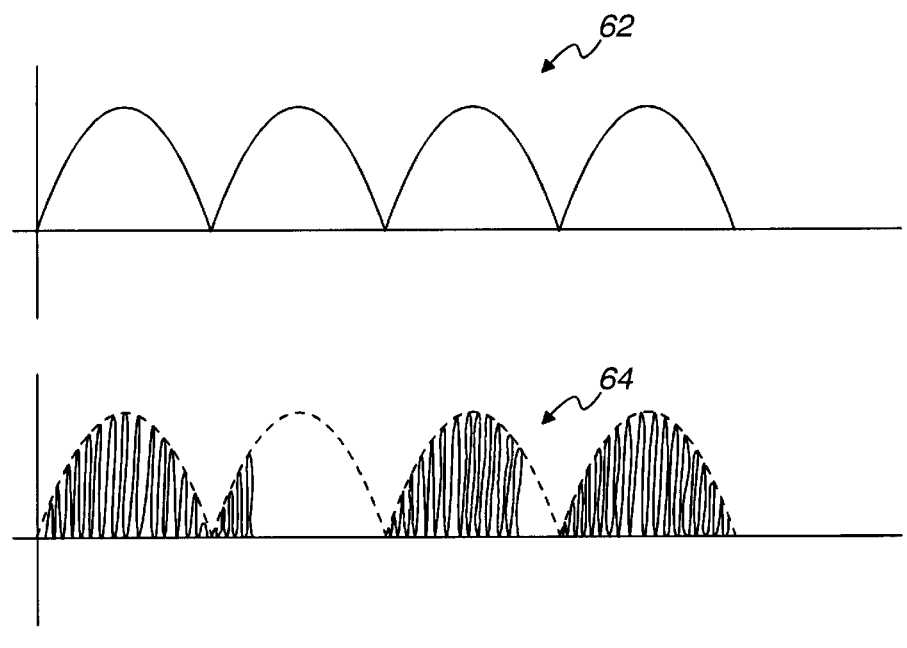
FIG. 3 is a graphical representation of exemplary wave forms experienced by various components from the circuit of FIG. 2.

A graphical representation of the gated output signal waveform generated by oscillator 56 and the effect on the waveform of the oscillator being inhibited are shown generally at reference numeral 64 in FIG. 3. The full wave rectified waveform 62 is shown in dashed lines and superimposed over the oscillator waveform to indicate the amplitude and phase angle of the main AC power signal. According to this graphical representation, the oscillator 56 continues to generate gating signals throughout the first cycle of the signal, but is then inhibited early on in the second cycle. In keeping with the preferred embodiment discussed above, the oscillator remains off until the mains frequency reaches an amplitude of zero, at which time the oscillator begins generating gating signals again. Later on in the third cycle of waveform 64, the oscillator is again inhibited and remains off until the next zero crossing. The last cycle shown for waveform 64 indicates that the oscillator 56 restarted at the zero crossing and continued generating gating signals throughout the entire cycle. In a typical movable barrier application, the oscillator may run uninhibited for several cycles and then be inhibited once a desired speed for the movable barrier has been reached. The inhibit phase angle at a relatively constant 60 Hz phase angle may remain constant unless the motor 60 is detected to need more or less power from converter 54, (e.g., in order to increase, decrease or maintain speed, etc.). Due to the critical roles timing and frequency play in the operation of apparatus 50, the controller 58 is coupled to the main AC power supply 51 so that it can monitor the mains frequency and remain synchronized with the remainder of the circuitry.

Figure 4A:
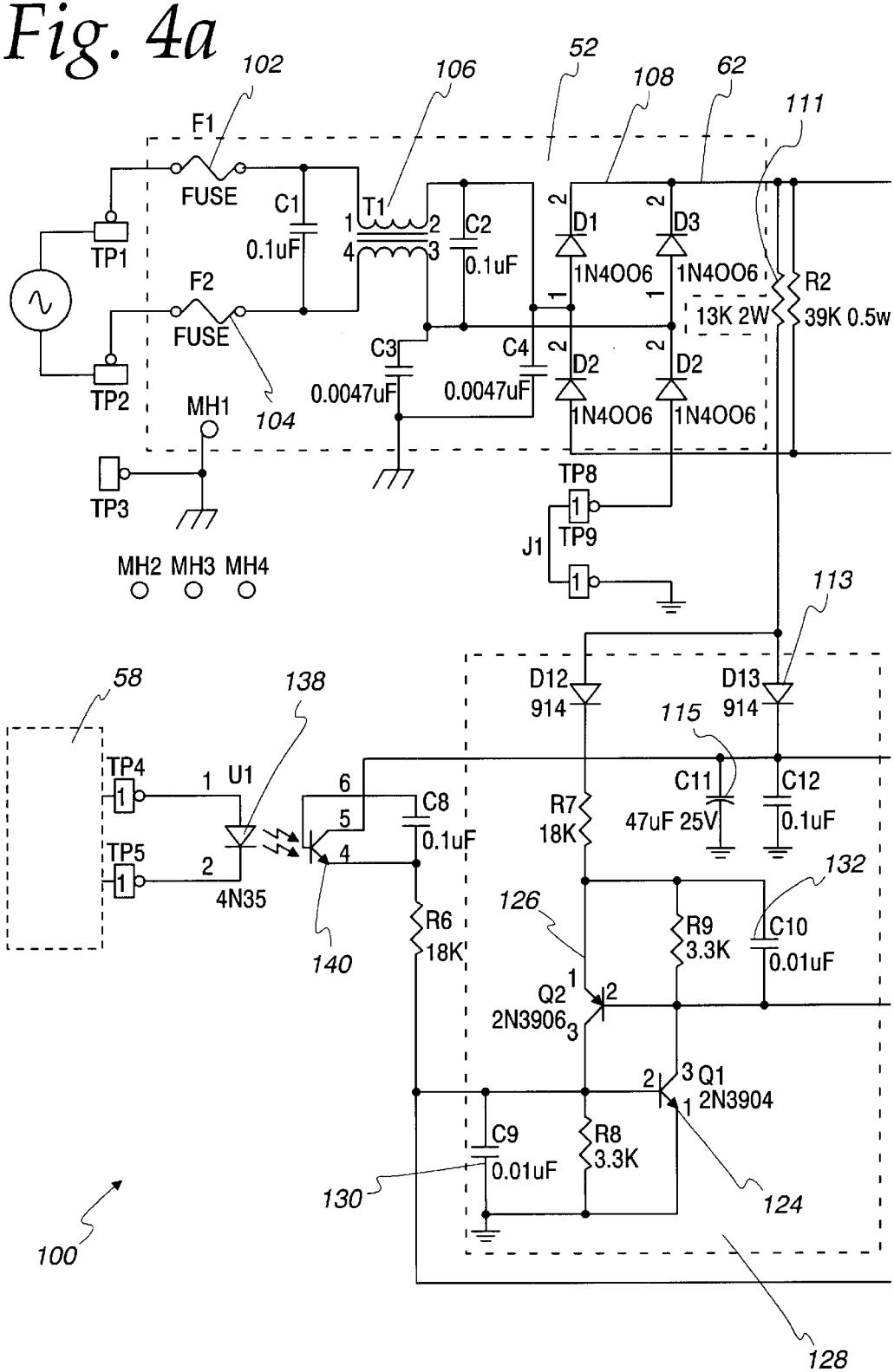
FIGS. 4, (4a–4b) is a schematic diagram of a circuit for a power controller.
Figure 4B:
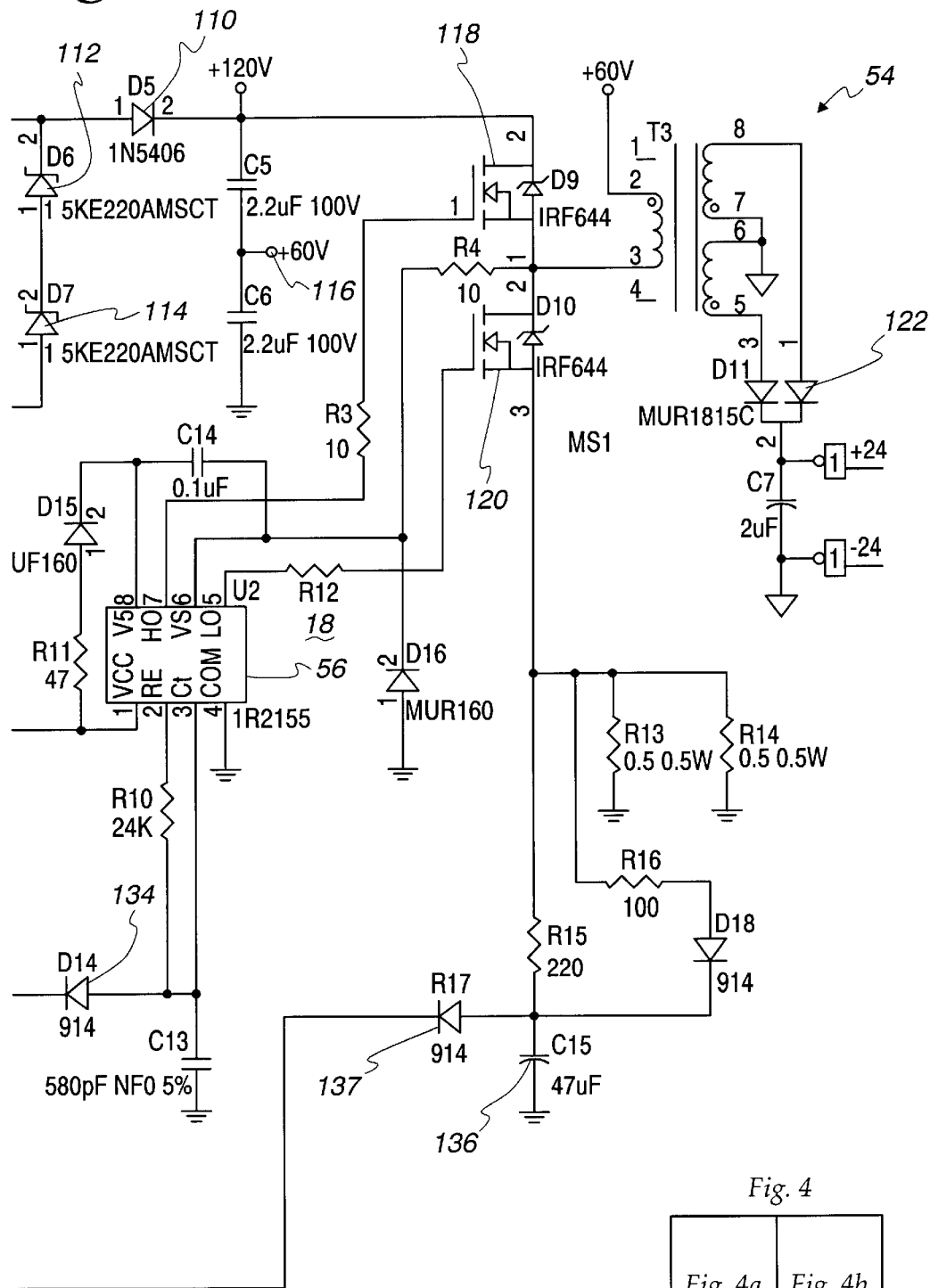
Figure 4:
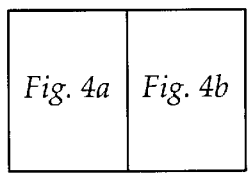

Turning now to FIG. 4, in which a schematic diagram of a circuit for a power controller 50 is shown generally at reference numeral 100. The power source 52 of circuit 100 converts an AC signal from a main AC power source operating at a common power source frequency, (e.g., 50 Hertz (50 Hz) in Europe, 60 Hertz (60 Hz) in the U.S., etc.), to a full wave rectified signal which is then fed to a DC chopper coupled to convertor 54 and supplies power to oscillator 56. More particularly, the AC signal is filtered by filter 106 and rectified by rectifier 108. The rectified signal is applied to a diode 110, voltage divider 116, and the gating circuitry consisting of MOSFETs 118 and 120 which are responsive to the gating signals generated by the oscillator 56 and supply power to convert 54 for generating DC voltage to motor 60.

The rectified signal is also converted to a DC potential via diode 113 and capacitor 115 and fed to pin Vcc of oscillator 56. The oscillator 56 operates at a higher frequency than the mains frequency, such as 40 kHz, due to the presence of resistor 124 and capacitor 126, and is used to generate gating signals which drive the MOSFETs 118 and 120 on and off. The MOSFETs may be IRF644 power MOSFETs manufactured by International Rectifier of El Segundo, Calif. More particularly, pin Rt of oscillator 56 is an output pin that behaves like a voltage source switching between Vcc and ground. Pin Rt is pulled low as the input on input pin Ct rises to a threshold of ⅔ Vcc, and is driven high when pin Ct falls to ⅓ Vcc. Pin LO is a low output that is driven high when pin Ct is low and pulled low when pin Ct is high. Pin HO is a high output that is driven high when pin Ct is high and pulled low when pin Ct is low. Pins LO and HO output the gating signals from oscillator 56 to MOSFETs 118 and 120 which are capable of dissipating considerable power. The gating circuitry in turn is coupled to converter 54 and supplies power for converter 54 to output a DC voltage supply to motor 60. As will be discussed in detail later, the controller 58 determines when and what polarity DC voltage is applied to motor 60.

The converter 54 includes a step-down transformer T3 which provides the usual high frequency step-down and isolation functions of any switched-mode power supply output transformer. The converter 54 steps the input voltage received from the gating circuitry down to +/−24V so that a standard DC motor 60 may be driven by circuit 100. In the embodiment shown, the +/−24V output is supplied from converter 54 to relays 242 and 244 of circuit 200 shown in FIG. 5. The transformer T3 of converter 54 has a split bobbin design wherein the primary winding is wound on one half of the bobbin and the secondary winding occupies the other half (physically) of the bobbin. The windings of transformer T3 are electronically isolated from each other by a center web located generally in the middle of the bobbin. This transformer design makes government agency approval (e.g., FCC approval) and product safety testing and standards organization certification (e.g. UL approval, CSA approval, etc.) easier to obtain with respect to dielectric breakdown and mandated creepage distances compared to the traditional "secondary over primary" winding design used in conventional power supplies. This transformer design also vastly reduces transformer labor content, and therefore cost, and increases leakage inductance by about a factor of 10 compared to the above-mentioned traditional design. This vast increase in leakage inductance would normally degrade output voltage regulation, however, as the supply loading of circuit 100 is increased the effective primary inductance progressively drops causing the resonant frequency of this inductance, combined with the filtering of voltage divider 116, to progressively rise toward the 40 kHz frequency of the switched mode power supply which boosts the actual primary voltage compensating for the voltage sag that would otherwise occur under load.

The apparatus 50 of circuit 100 further includes an inhibitor including a circuit 128 and/or a controller 58. In the embodiment shown, the circuit 128 operates like a silicon controlled rectifier (SCR), which when triggered, inhibits the oscillator 56 from generating gating signals. Two distinct circuit actions will trigger the SCR-like structure 128 into the ON state and inhibit the power supplying operation of circuit 100. First, the SCR-like structure 128 may be put into an ON state if a sufficient amount of over current is experienced for a period of time. The purpose for such over current protection is to protect the MOSFETS 118 and 120 and the load connected to circuit 100 from being irreparably damaged due to excessive power being applied and to keep the circuit 100 operating as desired. When excessive current is supplied to the gating circuitry, i.e., MOSFETs 118 and 120, capacitor 136 builds up a voltage level sufficient to allow current to flow through diode 137 turning on transistor 124 and placing the SCR-like structure 128 in the ON state. Once on, the SCR-like structure inhibits the oscillator 56 from generating gating signals which in turn keeps the converter 56 from supplying power to motor 60.

The second circuit action that will put the SCR-like structure 128 into an ON state (thereby inhibiting oscillator 56) is if the SCR-like structure 128 is triggered on by controller 58. When the controller detects a circuit condition in which it is desired to inhibit the oscillator 56, the controller 58 will generate a signal which switches on the SCR-like structure 128. In the embodiment shown, the controller 58 switches the SCR-like structure 128 into the ON state by turning on a light emitting diode (LED) 138 via pin P04 of controller 58 (see FIG. 4). Once LED 138 has been turned on, NPN photo-transistor 140 is switched on causing transistor 124 and the SCR-like structure 128 to go into the ON state and inhibit the oscillator 56.

As discussed above, in a preferred embodiment the oscillator 56 will remain off until the amplitude or phase angle of the mains frequency reaches zero. When a zero crossing is reached, the holding current through the circuit 100 via resistor 111 falls below the necessary holding current and the SCR-like structure 128 enters an OFF state allowing normal operation of oscillator 56 to resume. The oscillator 56 will continue to provide gating signals until the motor is to be turned off or until the oscillator 56 is again inhibited (e.g., via the controller 58, an over current condition, etc.).

Figure 5A:
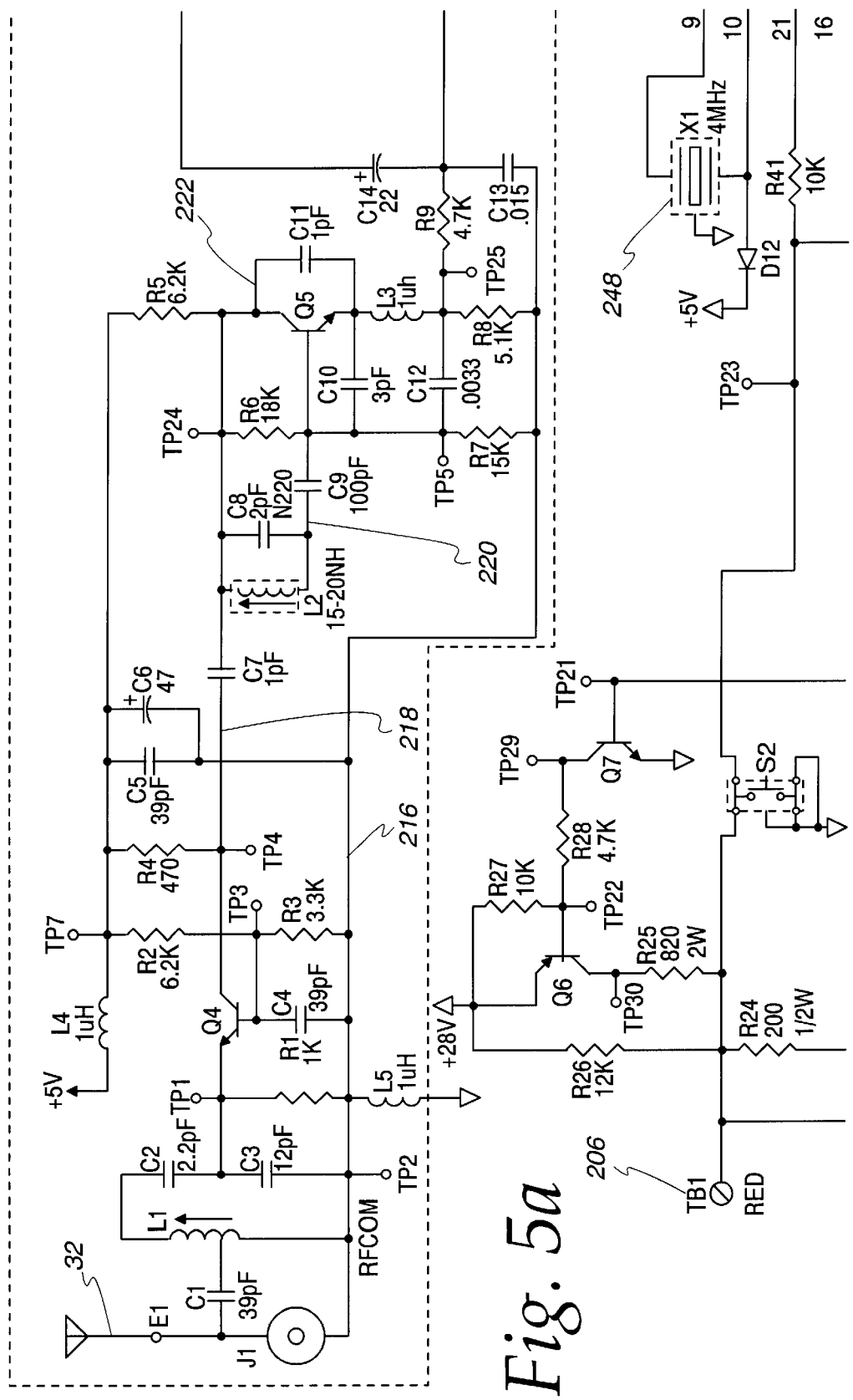
FIGS. 5, (5a–5d) is a schematic diagram of a barrier operator controller.
Figure 5B:
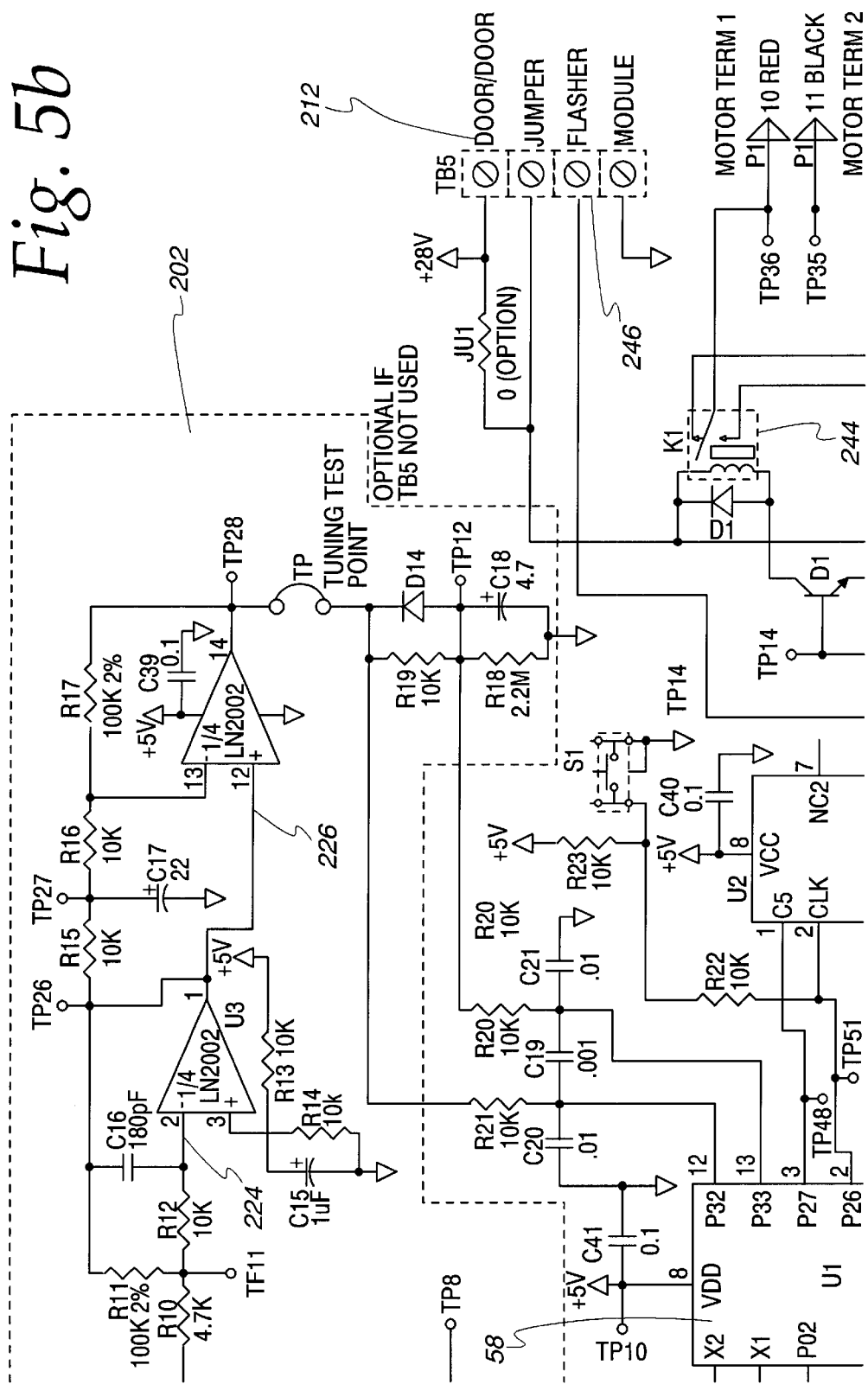
Figure 5D:
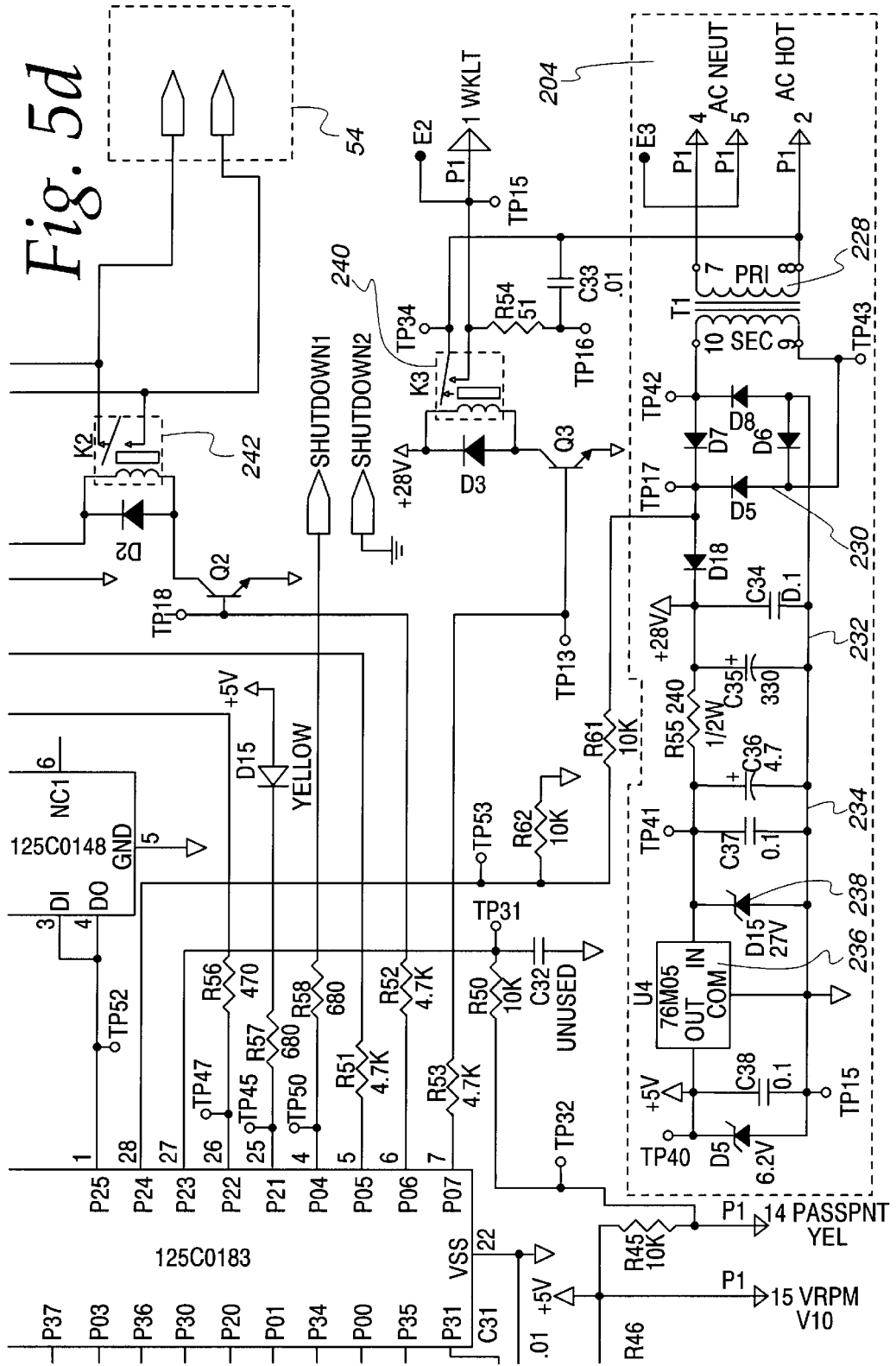

Referring now to FIG. 5, in which a schematic diagram of the barrier operator controller 58 is shown generally at reference numeral 200. The circuit 200 includes a controller 58 coupled to a receiver 202, power circuitry 204, a wall control 206, a barrier obstruction detector 208, a motor 210, and a set of miscellaneous movable barrier operator features 212 (e.g., flasher module, etc.). The receiver 202 includes an antenna 32 for receiving and delivering commands to controller 58. The received signal is passed through an amplifier 216 and feedback loop 218. The amplified signal passes through a filters 220, 224 and 276, and another amplifier, amplifier 222. The filtered and amplified command signal is then delivered to pins P32 and P33 of controller 58.

As discussed above, the controller 58 is coupled to the main AC power source via power circuitry 204, which allows the controller 58 to detect and mains frequency and remain synchronized with the circuit timing. The power circuitry 204 is capable of supplying an AC or DC voltage to the circuit 200 from the main AC power source. Transformer 228 filters the AC input signal which is then rectified by rectifier 230 to get a DC input. The filtered and rectified signal passes through an additional noise filter 234 made up of capacitors C36 and C37 and into regulator 236. Zener diode 238 is used to ensure that the voltage coming into voltage regulator 236 is not more than 28V. The voltage regulator 236 converts the 28V input into a 5V output which is fed to controller 58 at pin VDD for use with the digital logic circuitry. The 28V source supplied by the power circuitry 204 is fed to pin P24 of controller 58 and terminal block 246. The mains voltage is supplied to relay 240 which supplies power to a work light attached to relay 240 when instructed to do so by controller 58. As mentioned above, the +/−24V output supplied from converter 54 is fed to relays 242 and 244 which are coupled to motor 60 and pins P06 and P05 of controller 58. The controller 58 activates relays 242 and 244 according to what direction the motor is desired to travel in.

Controller 58 is coupled to a 4 MHz crystal oscillator 248 which provides the timing for the controller 58 at pins X1 and X2, and minimum/maximum up and down force setting circuitry 250 at pins P01, P34, P00 and P35. The up force is varied from a minimum setting to a maximum setting via the potentiometer (or variable resistor) 252. The down force is varied from a minimum setting to a maximum setting via the potentiometer 254. Examples of how these settings may be automatically adjusted are described in U.S. patent application Ser. No. 08/957,316 filed Oct. 23, 1997, now U.S. Pat. No. 6,107,765 which issued on Aug. 22, 2000 and is incorporated herein by reference.

Controller 58 is further coupled to the inhibitor of FIG. 3 via pin P04. As previously mentioned, the controller 58 may activate the inhibitor when certain circuit conditions are detected. For example, the controller 58 may detect that a certain RPM has been reached or door position/speed has been reached in response to which additional power should not be supplied to motor 60 from converter 54. In such instances, controller 58 outputs a inhibit signal from pin P04 activating the inhibitor and stopping the oscillator from driving the gating circuitry. According to the preferred embodiment discussed in FIG. 4, pin P04 of controller 58 is coupled to LED 138 of the circuit 100, whereby the controller 58 can then turn the LED 138 on and off. When the LED 138 is turned on, the NPN photo-transistor 140 is activated and the SCR-like structure 128 is put into an ON state causing the oscillator to be inhibited. The oscillator 56 remains off until the mains frequency reaches a desired amplitude or phase angle, (e.g., such as the next zero crossing of the AC signal).

The controller 58 is capable of monitoring a variety of circuit conditions and utilizes this information in controlling the motor 60. For example, the controller 58 monitors movable barrier position via a pass point input detected from inputs 256. Similarly, the controller 58 monitors motor speed via a RPM input detected from inputs 256. This information is then used by the controller 58 to determine what type of motor control is needed. For example, if the input 256 indicates that the motor should be sped up, slowed down, reversed, or stopped, the controller 58 will process the input and make the motor 60 respond accordingly. During instances where multiple types of feedback regarding circuit conditions are received, the controller 58 will process the input information and determine how best to respond, (e.g., analyzing what response makes the circuit operate most efficiently and safely). In alternate embodiments, the controller 58 may use an absolute positioning mechanism to track the position and speed of the movable barrier and/or speed of the motor 60.

As mentioned above, the apparatus 50 may be used with a variety of AC power supplies and at a variety of frequencies (e.g., 120V-240V AC operating at 60 Hz in the U.S., 240V AC operating at 50 Hz in Europe, etc.). Typically, separate circuits will be used to accommodate the U.S. market's 120V (60 Hz) power supply and the European market's 240V (50 Hz) power supply. However, the circuits of FIGS. 4 and 5 could be set up to adapt from the U.S. 120V to the European 240V. For example, a traditional front-end voltage doubler could be used for the U.S. 120V circuit and a rectifier could be used for the European 240V circuit. Alternatively, a dual primary high frequency transformer may be used along with two circuit layouts. In such a case, one circuit layout would connect the transformer in parallel and the other circuit layout would connect the transformer in series, (e.g., for 240V applications).

The circuitry of FIGS. 4 and 5 provide excellent coordination between the apparatus for supplying power 50 and the motor 60, which is needed in order for such an apparatus 50 to successfully regulate the amount of power supplied to the motor 60. The apparatus 50 rapidly senses when specified conditions have occurred and causes the oscillator to either shut off or turn on depending on what desired action is to be taken.

Thus it is apparent that there has been provided, in accordance with the invention, a power controller that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A power controller for a DC motor comprising:
   a source of low frequency electrical power;
   an oscillator for generating gating signals at a relatively higher frequency than the electrical power;

circuitry responsive to the gating signals for gating the electrical power to generate a DC voltage;

circuitry for applying the DC voltage to the DC motor; and an inhibitor for inhibiting the generating of gating signals by the oscillator to regulate the DC voltage generated.

2. A power controller according to claim 1, wherein the inhibitor comprises a programmable controller for inhibiting the generating of gating signals.

3. A power controller according to claim 2, wherein the controller is capable of sensing the phase of the low frequency power and inhibiting the oscillator in response to the sensed phase.

4. A power controller according to claim 1, comprising apparatus for sensing the phase of the low frequency electrical power and for re-enabling the oscillator at a predetermined phase of the low frequency.

5. A power controller according to claim 1, further comprising:

a DC motor connected to DC voltage; and circuitry for sensing power applied to the DC motor and for inhibiting the oscillator.

6. The apparatus of claim 2, wherein the controller comprises circuitry for stopping the oscillator.

7. The apparatus of claim 6, wherein the circuitry comprises means for starting the oscillator in response to the phase of the low frequency electrical power.

8. The apparatus of claim 2, wherein the controller comprises:

a DC motor connected to DC voltage;

apparatus for sensing the speed of the motor; and apparatus for inhibiting the oscillator to control the motor speed.

9. The apparatus of claim 1, wherein the power controller further comprises:

power sensing apparatus for sensing power applied to the motor; and shut down circuitry for inhibiting the oscillator when applied power exceeds a predetermined amount.

10. The apparatus of claim 9 wherein the shut down circuitry is coupled to the inhibit circuitry.

11. A method of controlling power supplied to a motor via a power controller having an oscillator, a converter responsive to the oscillator for regulating output power, and an inhibitor, the method comprising:

receiving an electrical power signal from a power source;

controlling the oscillator in response to receipt of electrical power signal to control the power output of the converter;

driving the converter by gating signals from the oscillator to output a desired voltage; and inhibiting the oscillator from generating the gating signals to regulate the output voltage supplied by the converter.

12. A method according to claim 11 comprising:

sensing the phase of the received electrical power signal; and inhibiting the oscillator in response to the sensed phase.

13. A method according to claim 11 comprising:

sensing the amount of output supplied by the converter; and inhibiting the oscillator in response to the sensed output.

14. A method according to claim 11 wherein the power controller has a motor coupled to the converter, the method comprising:

sensing speed of the motor; and inhibiting the oscillator in response to the sensed speed.

* * * * *